3,516,836
FRUIT CONTAINING BAKING MIXES
Richard A. Shea, Burnsville, Minn., assignor to The Pillsbury Company, Minneapolis, Minn., a corporation of Delaware
No Drawing. Filed Dec. 23, 1966, Ser. No. 604,163
Int. Cl. A21d 2/00, 13/08
U.S. Cl. 99—94                              24 Claims

ABSTRACT OF THE DISCLOSURE

Partially dehydrated fruit pieces are encapsulated with a coating having a melting point from about 95° to about 180° F. and which protects the fruit pieces from a loss or gain of moisture. Baking mixes containing the protectively coated partially dehydrated fruit pieces are adapted to provide a baked product wherein the fruit pieces have a taste and texture similar to freshly cut baked fruit pieces. Baking temperatures effectively remove the protective coating and the partially dehydrated fruit pieces are then fully hydrated.

---

This invention relates to baking mixes. More particularly, the present invention relates to dry, baking mixes containing encapsulated fruit pieces.

Baked products which contain fruit pieces have been known heretofore. Initially, such baked products were prepared by adding freshly cut fruit pieces to a batter or dough prior to the baking thereof. A principal difficulty encountered in the employment of freshly cut fruit pieces is to provide a baked product in which the fruit pieces are uniformly distributed since the pieces tend to settle in the dough or batter system.

Due to the potential marketability of dry, baking mix compositions containing fruit particles, food processing firms have unsuccessfully attempted to provide an acceptable fruit containing culinary composition. An approach by the art has been to provide dehydrated fruit particles which contain about 5 percent moisture in the dry mix ingredient. Unfortunately, the utilization of such dehydrated fruit particles presents several adverse problems. Firstly, these dehydrated fruit particles fail to adequately hydrate when the mix ingredients are reconstituted by the ultimate consumer. Consequently, the fruit particles are not uniformly dispersed throughout the batter or dough system and accordingly, the baked product lacks uniform fruit particle distribution. Secondly, it has been found that the dehydrated fruit particles do not provide a baked product which closely approximates the flavor and texture character of freshly cut fruit pieces. Thirdly, the dehydrated fruit pieces have a tendency to absorb moisture from the culinary mix ingredients and the atmosphere. Moisture absorption presents a problem in culinary mixes which contain a leavening base in that the acid contained in fruit reduces the leavening base effectiveness by reacting therewith. Lastly, the employment of such dehydrated fruit pieces is costly.

It is an object of the present invention to provide a dry, culinary composition adapted to provide a baked product having fruit pieces uniformly distributed therein.

Another object of the invention is to provide a dry, baking mix suitable for providing a baked product containing fruit pieces in which the texture and flavor is substantially the same as that of freshly cut fruit pieces.

A still further object is to provide a dry, baking mix which contains fruit pieces that are stable in a chemical leavening base system.

According to the present invention there is provided a dry culinary composition adapted for providing baked food products, said composition comprising baking mix ingredients and discrete fruit particles; said fruit particles comprising partially dehydrated fruit pieces being encapsulated with an edible protective coating, said protective coating being further characterized by providing a moisture rise rate of less than 1.4 and a melting point ranging from about 95° F. to about 185° F.

The dry, culinary composition containing a chemical leavening base and the present fruit particles provide unexpectedly, superior fruit containing baked products. The dry, culinary compositions can be reconstituted with an aqueous medium to provide a batter or dough in which the fruit pieces are uniformly distributed. Consequently, the resultant baked product contains a more uniform distribution of the fruit pieces therein. The encapsulating coatings for the fruit pieces remain intact under normal storage conditions and are not removed from the fruit pieces until the dry mix is reconstituted and baked. In general, upon baking the coating is melted and the fruit pieces then absorb sufficient moisture so that the resultant fruit pieces have a moisture content similar to that of baked goods containing freshly cut fruit pieces. Unlike culinary mixes containing uncoated, partially dehydrated fruit pieces, the present bakery mixes containing fruit pieces are stable against degradation. The instant culinary compositions provide a baked product with a flavor and texture similar to that provided by freshly cut fruit pieces. Proper acidulent level of the fruit pieces and basicity of the leavening base in the dry mix is not adversely affected.

It is an essential embodiment of the present invention to provide fruit pieces which contain from 12 to 30 percent by weight water. Fruit pieces containing from 12 to 30 percent by weight water are prepared by the partial dehydration of fruits. Suitable methods for preparing partially dehydrated fruits are disclosed, for example, in U.S. Pats. Nos. 2,477,605 by Howard et al.; 2,419,877 by Birdseye; 2,565,942 by Barsky et al.; 2,709,857 and 2,808,636 by Rivoche; 3,038,813 by Cording et al.; 2,979,412 by Lazar et al.; 3,219,461 by Lamb and 2,541,859 by Callaghan et al. For convenience, the whole fruits are advantageously reduced to about the size desired in the culinary composition prior to the dehydration thereof. Advantageously, the fruit pieces are partially dehydrated to a moisture content of about 15 to about 25 percent weight with a water content of about 20 percent by weight being the preferred level.

The present invention is adaptable to fruit pieces including those prepared by dehydrating fruit pieces and dehydrating mashed fruit constituents. Exemplary dehydrated fruit pieces include acid containing dehydrated fruit pieces such as apples, blackberries, strawberries, raspberries blueberries, cranberries, orange peelings, oranges, raisins, peaches, apricots, grapes, figs, pineapples, tangerines, lemons, lemon peelings, boysenberries, prunes, etc. Particle size of the dehydrated fruit may vary broadly (e.g., 50 to 3000 cubic millimeters), however, it is advantageous to employ dehydrated fruit pieces which have a particle size of about 100 to about 500 cubic millimeters with an optimum size being between about 200 and about 350 cubic millimeters.

An essential feature of the present invention is to encapsulate or coat the partially dehydrated fruit pieces (hereinbefore described) with an edible coating which possesses the following characteristics:

(a) An effective moisture barrier in respect to absorption and retention of moisture by the fruit piece as evidenced by a moisture rise rate of less than 1.4; and (b) Normally solid at room temperature with a melting point in the range of at least about 95° F. to about 185° F.

The moisture barrier property maintains the coated fruit particle at a proper density so that the particles are relatively stable against settling or rising in a batter or dough system when the dry mix is reconstituted by the ultimate consumer. Proper fruit particle density thus provides a means of maintaining uniform fruit piece distribution in the batter or dough prior to baking. Consequently, the baked product has a more uniform fruit piece distribution. The moisture barrier property prevents reaction between the fruit acids and the leavening base contained in the culinary composition. Without the encapsulating coatings, the fruit pieces contained in the dry mix readily degrade. Advantageously employed as a coating for the fruit particles are those coatings which exhibit a moisture rise rate of less than about 1.0 percent with a coating having a moisture rise rate of less than about 0.6 percent being preferred.

The recitation moisture rise rate as employed herein refers to percent by weight increase that a dry roasted, blanched peanut split containing 1.8 percent by weight water standard will gain over a 24 hour test period when subjected to a 64.3 percent relative humidity at 20° C.

It has been found that if uncoated, dry roasted, blanched peanut splits are maintained at 20° C. and a 64.3 percent relative humidity for 24 hours, the uncoated peanut splits will exhibit an increase in weight due to moisture absorption of 1.8 percent. By coating dry roasted, blanched peanut splits and testing the coated peanut at 64.3 percent relative humidity and 20° C. for 24 hours, the effectiveness of a particular coating can be ascertained by calculating the percent moisture gained thereby.

In addition to possessing effective moisture barrier properties the coatings, herein employed, are normally solid at room temperature but melt when subjected to elevated temperatures. Upon removal of the encapsulated coatings which generally occurs after reconstitution and during the baking cycle, the fruit particles absorb moisture. In general, an insoluble coating having a melting point in excess of about 150° F. will adversely affect the taste, texture and flavor of the fruit particles in most baked products.

Illustrative coatings adapted to the present invention broadly encompass those coatings which have a melting point ranging from about 95° F. to about 185° F. Those coatings which exhibit a melting point from about 95° F. to about 110° F. provide better overall performance than those coatings which exhibit a higher melting point. Optimum results are derived by employing coatings which have a melting point of about 95° F. to about 105° F.

In a more limited aspect of the invention, coatings which exhibit a solubility of less than 1 gram in 100 milliliters of water at 68° F. are employed. By employing coatings which are relatively insoluble in water, premature hydration of the partially dehydrated fruit pieces is obviated. Premature hydration of the fruit pieces increases the fruit piece density so that pieces have a tendency to settle in the batter. By delaying actual hydration of the fruit pieces until the baking cycle, the reconstituted mix ingredients have sufficient structure or viscosity to support the fruit pieces. Premature fruit piece hydration is advantageously provided by coatings which exhibit a solubility of less than 0.5 gram (at 68° F. in 100 ml.) with optimum results being provided by coatings which exhibit a solubility of less than 0.1 gram.

In general, a suitable method for preparing the encapsulated fruit pieces comprises submerging fruit pieces (which have been washed to remove foreign materials) in a coating composition comprising an edible, plastic normally solid film forming material which has been heated to temperatures above the melting temperature thereof whereby said coating material is liquified, agitating the fruit pieces while submerged, removing the excess coating composition from the fruit pieces while said coating is in a fluid condition and allowing the coated fruit pieces to reach a room temperature whereby an encapsulating film is formed over the surface of the fruit pieces.

Agitation for the submerged pieces can be provided by moving the fruit pieces mechanically within the liquid by means of a moving paddle or by causing the liquid itself to move. Satisfactory results have been obtained by pumping the washing and containing liquids in dipping tanks provided with a nozzle mounted on the side of the tank adapted to provide sufficient velocity and turbulence within the liquid. The turbulent movement of the liquid within the tank will then be transferred to the articles which are being coated causing them to tumble over one another. By submerging and agitating, an uninterrupted continuous film is provided on the fruit piece surfaces despite the uneven fruit piece surfaces (e.g., the recesses, depression and fissure thereof). The film thickness will vary depending upon the character and temperature of the coating material at the time coating is conducted and the temperature of the fruit piece surface during the removal of the excess coating material from the surface.

Following the coating operation, the fruit pieces are quickly removed from the tank and placed in a heated centrifuge while still hot. Suitable centrifuge angular velocity for removing excess coating ranges from 50 to 750 G's. If the G force is too low, excess coating will not be removed, however, too high G force will cause compression or formation of fruit piece aggregates.

The centrifuged hot fruit pieces are then cooled rapidly to room temperature preferably with agitation. Various forms of cooling can be employed but air cooling is preferred.

In general, average thickness of the encapsulating layer or coating ranges between about 0.1 to about 0.0002 millimeters with an average coating thickness of about 0.05 to about .0005 millimeters being preferred. The film provides shelf life improvement and prevents fruit piece adherence during storage. An excessively thick coating should be avoided since it inhibits the ability to effectively remove the coating during the baking cycle.

A variety of coating compositions can be employed. One general class of materials are the plastic edible shortening materials which are normally solid at room temperature. Many such materials are the vegetable shortenings derived from animals, acetylated monoglycerides and others. A preferred shortening material is distilled acetylated monoglycerides which is a nonfracturing, flexible and normally solid waxy material. The acetylated monoglycerides from the acetylation of glyceryl fatty acid esters in which about two-thirds free hydroxyl groups have been acetylated (e.g., acetylated glyceryl monostearate) at room temperature is a creamy white, waxy solid having a melting point of 94° F. to 104° F. The refractive index is 1.442 and viscosity is 27 cps. at 122° F. Iodine value is 3 max and saponification value of 323. The composition comprises about 7 percent monogolyceride and about 93 percent by weight acetylated monoglycerides.

Another suitable plastic shortening is hydrogenated coconut oil having a melting point (capillary) of 107.5±2.5 and a Wiley melting point of 100.5±2.5. The solid fat index at 50° F. is 64 percent ±3 percent and at 80° F. is 14 percent ±3 percent.

An additional suitable shortening type coating is confectioners coating butter (generally containing up to 30 percent by weight cocoa butter) obtained from hydrogenated vegetable oils. Such shortening exhibits no hydrolysis in the presence of moisture, excellent stability (400 to 500 hours on an A.O.M. stability test) and rapid meltdown without any chewyness or waxyness, a high softening and settling point of the fat. Typical commercially available coating butter shortenings have a capillary melting point of 99° F. ±1° F., solid fat index at 50 percent of 75 percent ±3 percent at 80° F. of 61 percent ±3 percent at 105° F. of 0 percent to 3 percent.

Typical employable coating and the moisture rise rate results achieved from coated, dry roasted, blanched peanut splits at 64.3 percent relative humidity and 20° C. for 24 hours are as follows:

| Coating constituents: | Moisture rise rate (percent by weight) |
|---|---|
| Cranberry wax | 0.08 |
| U.S.P. refined white beeswax | 0.37 |
| U.S.P. refined yellow beeswax | 0.41 |
| Refined candelilla wax | 0.42 |
| "Myvacet—type 7–00"[1] plus 5 percent sodium alginate | 0.46 |
| Refined white beeswax plus 6 percent by weight aluminum stearate | 0.46 |
| U.S.P. refined white beeswax plus 5 percent by weight sodium anhydrous pyrophosphate | 0.46 |
| "Myvacet—type 7–00"[1] 20 weight percent plus sorbitan monostearate[5] | 0.79 |
| "Myvacet 3–50"[6] | 0.86 |
| "Paramount C"[7] | 0.87 |
| Carboxymethylcellulose gel 5 weight percent plus "Myvacet—type 7–00"[1] 95 weight percent | 0.89 |
| "Myvacet—type 7–00"[1] 95 weight percent plus pregelatinized tapioca starch 5 weight percent | 0.94 |
| Gelatin gel 5 weight percent plus "Myvacet—type 7–00"[1] 95 weight percent | 0.95 |
| Triglyceride monostearate | 0.99 |
| "Methocel HG"[8] 5 weight percent plus "Myvacet—type 7–00"[1] 95 weight percent | 1.04 |
| Capric acid[9] | 1.04 |
| "Polyox WSR–301" 2.5 weight percent[10] plus "Myvacet—type 7–00"[1] | 1.07 |
| U.S.P. refined white beeswax plus 3 percent by weight sodium anhydrous pyrophosphate | 0.47 |
| U.S.P. refined white beeswax plus 1 percent by weight sodium anhydrous pyrophosphate | 0.51 |
| An inner coating of monocrystalline petroleum wax and outer coating of "Myvacet—type 7–00"[1] and 10 percent by weight sodium alginate | 0.51 |
| 90 percent by weight "Myvacet—type 7–00"[1] and 10 percent by weight dextrose | 0.54 |
| Monocrystalline petroleum wax | 0.57 |
| Refined carnauba wax | 0.59 |
| Refined carnauba wax | 0.60 |
| "Myvacet—type 7–00"[1] 20 weight percent and propylene glycol monostearate 80 weight percent | 0.63 |
| Propylene glycol monostearate | 0.71 |
| Carrageenan 7 weight percent plus "Myvacet—type 7–00"[1] 93 percent by weight | 0.73 |
| Refined white beeswax 20 percent by weight and "Myvacet—type 7–00"[1] 80 percent by weight | 0.74 |
| "Myvacet—type 7–00"[1] 20 weight percent plus sorbitan tristearate 80 weight percent[2] | 0.75 |
| Palmitic acid[3] | 0.78 |
| "Myvacet—type 7–00"[1] 95 weight percent plus "Klucel A"[4] | 0.78 |
| Myvacet—type 9–00"[11] | 1.08 |
| Diglycerol | 1.10 |
| Soy protein 5 weight percent plus "Myvacet—type 7–00"[1] | 1.12 |
| Gum arabic 10 weight percent plus "Myvacet—type 7–00"[1] | 1.22 |
| "Kelset algin"[12] 2 weight percent plus "Myvacet—type 7–00"[1] | 1.36 |

[1] Acetylated monoglyceride sold by Distillation Products Industries as described in column 4, lines 50–68 hereinbefore.
[2] Sold by Armour Industrial Chemical Company under the trademark "Armotan TS" (M.P. 54° C. and hydroxyl value of 66–88).
[3] Commercial grade.
[4] A hydroxypropyl cellulose approved for food use under FDA Section 121.1160.
[5] Sold under the trademark "Armoton MS" (M.P. 54° C. and hydroxyl value of 235–260).
[6] Product sold by Distilling Products Industries Company containing 35–50 weight percent glyceryl monostearate and 50–65 weight percent propylene glycol monostearate.
[7] A hydrogenated coconut oil defined in column 4, lines 69–73 hereinbefore.
[8] A methylcellulose sold under the trademark "Methocel HG."
[9] Commercially pure capric acid.
[10] A polyethylene glycol.
[11] Double distilled acetylated monoglyceride in which 90 percent of free OH groups have been acetylated.
[12] Sodium alginate.

Dry culinary mixes to which the instant invention is directed include those mixes which contain chemical leavening as dry mix ingredients. Illustrative chemically leavened baking mixes include cake, roll, biscuit, cobbler, shortbread, bread, muffin, pie crust mixes and other similar products. These mixes customarily contain farinaceous materials (e.g., flour and starch) and chemical leavening. In such mixes, large amounts of starch may be substituted for the flour provided the farinaceous material mixes contain sufficient protein.

Although the below-mentioned, illustrative mixes are expressed in relation to flour, it is apparent that a functional equivalent of farinaceous materials may be employed as a substitute for a portion of the flour.

Chemically leavened baking mixes to which the fruit particles are adaptable include the shortening and non-shortening based cake mixes. Shortening based cake mixes such as white and yellow cake mixes broadly contain on a dry weight basis from about 20 percent to 50 percent flour, about 20 percent to 70 percent sugar, about 5 percent to 15 percent shortening and from about 0.5 percent to about 4 percent chemical leavening. Non-shortening based cake mixes such as the chemically leavened angel food cake mixes, as disclosed in U.S. Pat. 3,038,808 by J. R. Perrozzi et al., are broadly comprised of about 10 to about 30 weight percent flour, about 50 to about 75 weight percent sugar, about 5 to about 20 weight percent egg albumen (dry weight basis) and from about 1 to about 8 weight percent chemical leavening.

Chemically leavened bread mixes with the fruit containing particles, contemplated herein, broadly comprise about 35 to about 80 percent flour, 5 to 50 percent sugar and chemical leavening in an amount ranging from about 2.0 to about 8 weight percent with about 2 to 10 weight percent shortening. Also included are biscuit mixes which broadly contain from 75 to 90 percent by weight flour (usually 80 to 85 percent flour), about 5 to about 10 percent by weight shortening or fat and about 2 to about 5 percent by weight chemical leavening.

From the aforementioned chemically leavened baking dry mixes, it is evident that the amount of chemical leavening broadly ranges from about 0.5 to about 8 percent by weight, the sugar from 0 to about 90 weight percent, from about 10 to 90 weight percent flour and shortening in an amount of from 0 to about 15 weight percent.

The leavening composition as conventionally employed in chemically leavened baking mixes consists essentially of a leavening base such as sodium bicarbonate and at least one leavening acid. Occasionally, the leavening base is omitted from the baking mix by the processor with the homemaker adding the soda to the reconstituted batter. Typical leavening acids are sodium acid pyrophosphate, anhydrous monocalcium phosphate, monocalcium phosphate monohydrate, adipic, fumaric acid, glucono delta lactone, citric acid, monosodium phosphate, tartaric acid, potassium acid tartrate, alpha-glucoheptono-gamma-lactone, mixtures thereof and the like. In order to obviate an undesirable color and bitter taste, a molar excess of the leavening acid is conventionally added to the dry mix ingredients. The molar excess of acid should be sufficient to provide a pH less than 7 and advantageously more than 4 when 18 grams of the finely divided baked goods crumbs are dissolved in 100 milliliters of water.

Various other conventional baking mix ingredients in quantities and proportions commonly added to dry baking mixes such as color and flavor additives, foam stabilizers, preservatives, buffer salts, surface active agents, egg albumen, nonfat dry milk solids, starch, gum arabic carboxymethylcellulose, artificial sweeteners, sodium caseinate and the like may be included depending upon the ultimate desired product.

The fruit particles are preferably homogenously admixed with the desired bakery mix ingredients in a weight ratio ranging from about 1 part to about 12 parts by weight fruit particles to 40 parts by weight of the bakery mix ingredients. From an economic and taste viewpoint, the bakery mixes usually contain from about 1 to about 3 parts by weight fruit particles to 20 parts by weight of remaining mix ingredients.

The fruit particles should be homogenously dispersed into the bakery mix ingredients in a manner such that attrition of the coating is avoided, A high percentage of crystalline mix ingredients (e.g., sugar) coupled with excessive blending will cause attrition of the coating. Likewise, excessive mechanical handling of the fruit particles can remove the encapsulating layer. Thus, for bakery mixes which are comprised of sugar as a major bakery mix ingredient, better results are achieved by conventionally blending all of the mix ingredients before homogenously incorporating the fruit particles therein. In general, the fruit particles can be homogenously dispersed in the bakery mix by a ribbon blender or Hobart mixer operated at a low speed in about 2 to 5 minutes.

Unless expressly stated otherwise, the weight percents of flour, sugar, shortening, chemical leavening and other bakery mix ingredients stated herein are based upon the weight of such ingredients contained in the bakery mix excluding the weight of the fruit particles provided therein.

In general, the dry baking mixes provided herein, excluding moisture provided by the fruit particles have a moisture content of less than about 8 percent by weight.

The following examples are illustrative of the invention:

EXAMPLE I

(A) Preparation of coated apricot pieces

Dehydrated apricot pieces (¼ inch by ¼ inch by 3/16 inch) having a moisture content of 22 percent were encapsulated with an acetylated monoglyceride coating composition.[1] Coating or encapsulation thereof was accomplished by submerging the fruit pieces in a 100 gallon tank containing a molten coating composition mixture comprising about 99.8 percent by weight of an acetylated monoglyceride composition and 0.2 percent by weight citric acid. The mixture is held at 140° F. and the apricot pieces are agitated moderately with a paddle type mixer for a period of 90 seconds while immersed in a molten mixture.

After being submerged for 90 seconds, the fruit pieces were removed from the molten mixture and immediately placed into a centrifuge maintained at a temperature of 180° F. Excessive coating was removed by spinning the coated fruit pieces in the centrifuge for a period of 2 minutes at a force of 150 G's. The coated apricot particles were then removed from the centrifuge and cooled to less than 100° F. in about 3 minutes by a current of cool, dry air (at 50° F. and R.H. of 20 percent). Coating thickness was about 0.001 millimeters with a moisture rise rate of 0.76.

(B) Preparation of apricot bread mix

An apricot nut bread mix (quickbread) was prepared from the following mix ingredients:

| Ingredients: | Percent by weight |
|---|---|
| Bleached flour | 43.3 |
| Sugar | 34.4 |
| Wheat germ | 2.7 |
| Corn sugar | 2.5 |
| Soda | 0.5 |
| Sodium anhydrous pyrophosphate | 0.2 |
| Anhydrous monocalcium phosphate | 0.1 |
| Salt | 0.4 |
| Shortening | 7.7 |
| Coated apricot particles | 8.0 |
| Cellulose gum | 0.2 |
| | 100.0 |

In preparing the apricot bread mix, all of the aforementioned ingredients with the exception of the shortening and coated apricot particles were homogenously dry blended in a conventional ribbon blender for 10 minutes at 85° F. Operating the ribbon blender at a low speed for 2 minutes, the coated apricot particles prepared in accordance with Example I–A were then homogenously blended into the bread mix. Shortening was then added to the blended dry mix ingredients and the resultant product was blended for an additional 7 minutes at a high speed. For comparative purposes, a homogenous bread mix containing uncoated apricot pieces with a moisture content of 4 percent by weight was prepared.

Storage stability tests for the apricot containing bread mixes were conducted at repeated 12 hour cycles at 90° F. with a 60 percent relative humidity and 75° F. at 91 percent relative humidity for 26 weeks. Notwithstanding the lower moisture content for the uncoated apricot bread mixes, it was found that the uncoated apricot pieces were blackened due to a chemical reaction between the fruit acid and the mix leavening base (i.e., soda). Uncoated apricot pieces (i.e., 4 percent by weight moisture) per se without the leavening base were not degraded when subjected to identical test conditions. The coated, partially dehydrated apricot pieces, however, retained substantially the same initial orange color. Comparative field tests conducted for 1 year under seasonal storage conditions provided similar results.

(C) Apricot bread

Apricot breads (quickbreads) were prepared by adding 1 medium sized egg and 1 cup of water to a large mixing bowl. Aliquots of 17 ounces of the bread mix, prepared in accordance with Example I–B were then added to the mixing bowl and the mix ingredients were moistened by mixing the ingredients with a wooden, standard household, mixing spoon (e.g., 60 strokes). The resultant batter was then placed in a greased, 9 by 5 inch loaf pan and baked at 350° F. for 55 minutes. The baked products were cooled for 10 minutes and removed from the pans. Vertical cross cuts of the breads were made. It was observed that the apricot bread products prepared from the mixes containing the uncoated apricot pieces (i.e., 4 percent moisture content), contained a major portion of the pieces in the upper quarter portion of the bread. The breads prepared from the coated, partially dehydrated apricot bread mixes indicated uniform apricot piece distribution.

The breads prepared from the apricot mixes containing uncoated fruit pieces had a pronounced and detectable ---
[1] "Myvacet—type 7–00" sold by Distillation Products Industries as described in column 4, lines 50–68 hereinabove.

flavor loss in comparison to those prepared from the coated apricot pieces. The breads containing the uncoated fruit pieces were less moist and of a tougher texture than those which were prepared from the coated apricot pieces.

EXAMPLE II

A raspberry angel food cake mix containing the following ingredients was prepared:

| Ingredients: | Ounces |
|---|---|
| Farinaceous materials | 198.0 |
| starch 81 | |
| gelatinized starch 2 | |
| hard wheat flour 115 | |
| Sugar (sucrose) | 505.0 |
| Citric acid | 5.6 |
| Fumaric acid | 19.0 |
| Egg albumen | 137.0 |
| (spray-dried sugar-albumen 1:2 ratio) | |
| Gum arabic | 2.2 |
| Artificial raspberry flavoring | 1.5 |
| Cream of tartar | 6.3 |
| Raspberry particles [13] | 75.0 |

[13] 1/4 inch by 1/4 inch by 3/16 inch partially dehydrated raspberry fruit pieces (22 percent by weight moisture) with a coating of refined white beeswax prepared in accordance with the method of Example I–A.

The resultant angel food mix exhibited a storage stability similar to the mix of Example I–B.

The angel food cakes containing the raspberry pieces were prepared by adding 1¼ cups of water to 17 ounces of the angel food mix. The mixes were then blended with a standard household mixer at a low speed (350 r.p.m.) for 1 minute in standard mixing bowls after which the resultant viscous batters were poured into standard angel food cake pans and baked at 350° F. for 40 minutes.

Uniform fruit piece distribution in the resultant angel food cake was observed. The raspberry fruit pieces imparted to the angel food cakes a flavor and texture similar to that of freshly cut raspberry pieces.

EXAMPLE III (A) Multipurpose chemically leavened bakery mix

A multipurpose, chemically leavened bakery mix adapted to provide a variety of baked products such as biscuits, crumb cakes, coffee cakes, shortcakes and muffins and containing fruit particles was prepared. The chemically leavened bakery mix without the fruit particles consisted essentially of the following ingredients and amounts thereof:

| Ingredients: | Percent by weight |
|---|---|
| Flour [14] | 83.5 |
| Fat [15] | 7.5 |
| Nonfat dry milk | 2.5 |
| Sodium bicarbonate | 1.7 |
| Anhydrous monocalcium phosphate | 1.8 |
| Salt | 1.5 |
| Dextrose | 1.5 |
| | 100.0 |

[14] 10 percent soft wheat flour.
[15] Containing 0.05 percent by weight mono- and diglycerides and preservatives.

(B) Pineapple muffins

Employing the aforementioned multipurpose mix prepared by conventional means, a pineapple muffin mix was prepared by admixing 40 parts by weight of the multipurpose mix with 3 parts by weight of partially dehydrated pineapple pieces (¼ inch by ¼ inch by 3/16 inch) having a residual moisture content of about 20 percent by weight and a coating of acetylated monoglyceride (97 percent) and sodium anhydrous pyrophosphate (3 percent).

Two cups of the muffin mix was reconstituted with 1 egg, ¾ cup of milk, 4 tablespoons of sugar and 2 tablespoons of melted shortening and mixed with a standard household mixer operated at a high speed for 30 seconds. The resultant reconstituted muffin mix was placed in 12 medium muffin pans (⅔ full) and baked in an oven maintained at 400° F. for 15 minutes.

The resultant muffins contained uniform distribution of the fruit pieces with a taste and texture similar to that of freshly cut fruit pieces. The pineapple muffin mix exhibited a stability similar to that observed for the apricot mix of Example I–B.

(C) Orange peeling crumb cake

An orange peeling crumb cake mix containing 1 part by weight of orange peelings (at 16 percent moisture) coated in accordance with the method of Example I–A with propylene glycol monostearate (95 percent by weight) and pregelatinized tapioca starch (5 weight percent) and 40 parts by weight multipurpose mix containing orange flavoring was prepared.

The crumb cake was then prepared by blending ¼ cup of milk with ¾ cup of sugar, 1 egg, 3 tablespoons of melted shortening and 1⅓ cups crumb cake mix at a slow speed with a standard household mixer followed by the beating thereof for 1 minute at a medium speed; an additional ½ cup of milk was stirred into the reconstituted mix and then beat for an additional 30 seconds at a medium speed.

The resultant batter was then placed in a 9 inch, round pan and baked in an oven for 35 minutes. The resultant cake mix and cakes exhibited properties similar to that observed in Examples I–B and I–C.

What is claimed is:

1. A dry, free-flowing fruit containing baking mix, said mix comprising a homogeneous admixture of baking mix ingredients and discrete fruit particles, said fruit particles consisting essentially of partially dehydrated fruit pieces having a moisture content from about 12 to 30 percent by weight water and an encapsulating, protective coating on said fruit pieces, said protective coating being further characterized as being on the surface of said fruit pieces and providing a moisture rise rate of less than 1.4 when subjected to test conditions equivalent to a 64.3 percent relative humidity at 20° C. for 24 hours, and a melting point ranging from about 95° F. to about 180° F.

2. The baking mix according to claim 1 wherein the mix contains at least 10 percent by weight flour and from about 0.5 to about 8 percent chemical leavening.

3. The baking mix according to claim 2 wherein the fruit particles are homogeneously dispersed in the mix in an amount ranging from about 1 to about 12 parts by weight fruit particles for each 40 parts by weight baking mix ingredients and the average thickness of the protective coating ranges between about 0.1 to about 0.0002 millimeters.

4. The baking mix according to claim 3 wherein the moisture content of the fruit pieces ranges from about 15 to about 25 weight percent.

5. The mix according to claim 4 wherein the melting point of the protective coating ranges from about 95° F. to about 150° F.

6. The mix according to claim 5 which comprises flour in an amount from about 35 to about 80 weight percent, sugar in an amount of about 5 to about 50 weight percent, chemical leavening in an amount ranging from about 1 to about 8 weight percent and from about 2 to about 20 percent by weight shortening and the average thickness of the protective coating ranges from about 0.05 to about 0.0005 millimeters.

7. The mix according to claim 6 wherein flour in an amount from about 25 to about 45 percent by weight of the baking mix ingredients is provided therein.

8. The mix according to claim 7 wherein sugar in an amount ranging from about 25 to about 50 percent by weight of the baking mix ingredients is provided therein.

9. The mix according to claim 8 wherein the leavening comprises a leavening acid and leavening base in an amount ranging from about 2 to about 5 weight percent.

10. The mix according to claim 9 wherein the fruit particles have a particle size ranging from about 100 to about 500 cubic millimeters and the protective coating is characterized as providing a moisture rise rate of less than 1.0 percent and a solubility of less than 1 gram in 100 milliliters of water at 20° C.

11. The mix according to claim 10 wherein the fruit particles have a particle size ranging from about 200 to about 350 cubic millimeters.

12. The mix according to claim 11 wherein the shortening ranges in an amount from about 5 to about 15 weight percent.

13. The mix according to claim 1 wherein the protective coating is further characterized as providing a melting point from about 95° F. to about 110° F. and the solubility is less than 0.5 gram in 100 milliliters of water at 20° C.

14. The mix according to claim 13 wherein the baking mix contains about 2 to 8 parts by weight fruit particles for each 40 parts by weight baking mix ingredients.

15. A non-shortening based cake mix according to claim 5 wherein the baking mix ingredients comprise about 10 to 30 weight percent flour, about 50 to about 75 weight percent sugar and from about 1 to about 12 weight percent chemical leavening.

16. The mix according to claim 15 wherein the fruit particles have a particle size ranging from about 100 to about 500 cubic millimeters and the protective coating is further characterized by providing a moisture rise rate of less than 1.0 percent and a solubility of less than about 0.5 gram in 100 milliliters of water at 20° C.

17. A single-stage angel food cake mix according to claim 16 wherein the mix ingredients comprise from about 18 to about 25 weight percent flour, from about 55 to 65 weight percent sugar, chemical leavening in an amount ranging from about 2 to about 8 weight percent and egg albumen in an amount ranging from about 7 to about 14 weight percent.

18. The mix according to claim 17 wherein the particle size ranges from about 200 to about 350 cubic millimeters and the amount of fruit particles contained in the mix ranges from about 1 to 6 parts by weight for each part by weight of mix ingredients.

19. The mix according to claim 5 which contains as baking mix ingredients about 75 to about 90 weight percent flour and from about 2 to about 5 percent by weight chemical leavening.

20. The mix according to claim 19 wherein the fruit particles have a particle size ranging from about 200 to about 350 cubic millimeters.

21. The mix according to claim 20 which contains as a baking mix ingredient from about 5 to about 10 weight percent shortening.

22. The mix according to claim 21 wherein about 1 to about 6 parts by weight fruit particles for each 40 parts by weight of mix ingredients is provided therein.

23. The mix according to claim 22 wherein the protective coating is further characterized as providing a moisture rise rate of less than 1.0 percent and a solubility of less than 0.5 gram in 100 milliliters of water at 20° C.

24. The mix according to claim 22 wherein the melting point of the coating ranges from about 95° F. to about 110° F.

References Cited

UNITED STATES PATENTS

| | | | |
|---|---|---|---|
| 2,909,435 | 10/1959 | Walters et al. | 99—168 |
| 2,975,059 | 3/1961 | Andrews | 99—94 |
| 3,020,164 | 2/1962 | Forkner | 99—94 XR |
| 3,383,217 | 5/1968 | Meade et al. | 99—94 |
| 3,406,078 | 10/1968 | Williams | 99—104 XR |

RAYMOND N. JONES, Primary Examiner

U.S. Cl. X.R.

99—83, 90, 92, 168